Figures 1, 2:
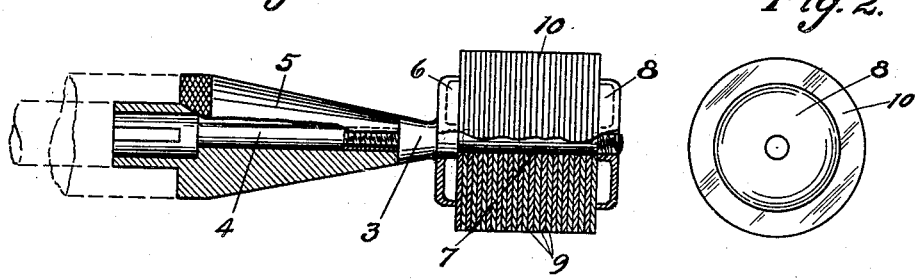

May 31, 1932.  H. J. STEVENSON ET AL  1,860,630
MANICURING BUFFER

Filed April 2, 1930

Harvey J. Stevenson
and
Merill Kessler
Inventors

Attorney

Patented May 31, 1932

1,860,630

UNITED STATES PATENT OFFICE

HARVEY J. STEVENSON AND MERRILL KESSLER, OF LOS ANGELES, CALIFORNIA, ASSIGNORS TO NATIONAL MANICURING MACHINE CO., OF LOS ANGELES, CALIFORNIA, A CORPORATION OF DELAWARE

MANICURING BUFFER

Application filed April 2, 1930. Serial No. 441,061.

Our invention relates to manicuring buffers, and more particularly to a construction and arrangement whereby a series of disks of fabric, such as chamois skin or other suitable material, are clamped together axially upon a driving shaft, and in such a manner that said material yields as it is applied to a nail for the purpose of polishing the nail.

One of the principal objects of our invention is to provide a new construction and arrangement of buffer, whereby the material is applied edgewise to the nail, with a yielding contact, instead of applying said material flatwise, so that it is worn through more quickly and becomes unusable.

In order to explain our invention, we have illustrated one practical embodiment thereof on the accompanying sheet of drawings, which we will now describe.

Figure 1 is a side elevation of a buffer embodying our invention, with a portion of the conical bearing member shown in section, and a portion of the buffer proper shown in section; and Figure 2 is an end view thereof.

In the drawings, 3 designates a connecting and driving shank for attachment to a driving shaft 4 within a conical bearing member 5, of the usual type. Said shank has formed integrally therewith, as here shown, a cup-like disk 6, upon a shaft portion 7, with a cup-like disk or nut 8, screwed upon the outer end of said shaft 7. Threaded on said shaft 7, and clamped between said cup members 6 and 8, are disks 9 of chamois skin or other suitable material, forming the buffer body designated as a hole 10. The annular hollow portions of the cup-like members 6 and 8 make it possible for the flexible disks 9 to yield when pressed upon the nail in the polishing operation. It will be recognized, also, that it is easy to replace the buffer disks for new ones at any time, and to do it very conveniently.

While we have shown and described one particular form or embodiment of our invention, we do not limit the invention to these details, except as we may be limited by the hereto appended claim.

We claim:

A manicuring buffer of the character shown and described, comprising a shank portion, with means at one end for attaching it to a driving shaft, and a shaft portion extended from its opposite end, with two cup-like portions thereon, and a series of disks of soft flexible material and slightly larger in diameter than said cup-like portions threaded on said shaft portion and clamped thereon between said cup-like portions, whereby said flexible material can flex into said cup-like portions.

Signed at Los Angeles, Los Angeles County, California, this 28th day of March, 1930.

HARVEY J. STEVENSON.
MERRILL KESSLER.